United States Patent
Young et al.

(10) Patent No.: US 6,389,136 B1
(45) Date of Patent: *May 14, 2002

(54) AUTO-RECOVERABLE AND AUTO-CERTIFIABLE CRYPTOSYSTEMS WITH RSA OR FACTORING BASED KEYS

(76) Inventors: Adam Lucas Young, 535 W. 110th St. Apt. 12J; Marcel Mordechay Yung, 605 W. 112th St. Apt. 4H, both of New York, NY (US) 10025

( * ) Notice: Subject to any disclaimer, the term of this patent is extended or adjusted under 35 U.S.C. 154(b) by 0 days.

This patent is subject to a terminal disclaimer.

(21) Appl. No.: 08/932,639

(22) Filed: Sep. 17, 1997

Related U.S. Application Data

(63) Continuation-in-part of application No. 08/920,504, filed on Aug. 29, 1997, now Pat. No. 6,243,466, which is a continuation-in-part of application No. 08/878,189, filed on Jun. 18, 1997, now Pat. No. 6,122,742, which is a continuation-in-part of application No. 08/864,839, filed on May 28, 1997, now Pat. No. 6,202,150.

(51) Int. Cl.$^7$ .................................................. H04L 9/30
(52) U.S. Cl. ........................... 380/28; 380/30; 380/44; 713/156; 713/180
(58) Field of Search .................. 380/21.25, 44, 380/30, 28; 713/156, 180

(56) References Cited

U.S. PATENT DOCUMENTS

| | | |
|---|---|---|
| 4,200,770 A | 4/1980 | Hellman et al. |
| 4,218,582 A | 8/1980 | Hellman et al. |

(List continued on next page.)

OTHER PUBLICATIONS

Bruce Schneier, Applied Cryptograpy, 185–186, 531–532, 97–98,591, 585–586,1995.*

(List continued on next page.)

Primary Examiner—Reba I. Elmore
(74) Attorney, Agent, or Firm—Schweitzer Cornman Gross & Bondell LLP

(57) ABSTRACT

A method is provided for an escrow cryptosystem that is essentially overhead-free, does not require a cryptographic tamper-proof hardware implementation (i.e., can be done in software), is publicly verifiable, and cannot be used subliminally to enable a shadow public key system. The keys generated are based on composite numbers (like RSA keys). A shadow public key system is an unescrowed public key system that is publicly displayed in a covert fashion. The keys generated by the method are auto-recoverable and auto-certifiable (abbrev. ARC). The ARC Cryptosystem is based on a key generation mechanism that outputs a public/private key pair, and a certificate of proof that the key is recoverable by the escrow authorities. Each generated public/private key pair can be verified efficiently to be escrowed properly by anyone. The verification procedure does not use the private key. Hence, the general public has an efficient way of making sure that any given individual's private key is escrowed properly, and the trusted authorities will be able to access the private key if needed. Since the verification can be performed by anyone, there is no need for a special trusted entity, known in the art as a "trusted third party". Furthermore, the system is designed so that its internals can be made publicly scrutinizable (e.g., it can be distributed in source code form). This differs from many schemes which require that the escrowing device be tamper-proof hardware. The system is efficient and can be implemented as a "drop-in" replacement to an RSA or Rabin cryptosystem. The system is applicable for law-enforcement, file systems, e-mail systems, certified e-mail systems, and any scenario in which public key cryptography can be employed and where private keys or information encrypted under public keys need to be recoverable. Another aspect of the system is the possibility to organize it in a hierarchical tree structure, where each element in the tree is an escrow authority (or authorities) capable to recover keys and/or information encrypted under these keys within the subtree rooted at the authority (or authorities) and only within this subtree.

19 Claims, 8 Drawing Sheets

U.S. PATENT DOCUMENTS

| | | | |
|---|---|---|---|
| 4,405,829 A | | 9/1983 | Rivest et al. |
| 4,424,414 A | | 1/1984 | Hellman et al. |
| 4,625,076 A | | 11/1986 | Okamoto et al. |
| 4,641,346 A | | 2/1987 | Clark et al. |
| 4,748,668 A | | 5/1988 | Shamir et al. |
| 4,881,264 A | | 11/1989 | Merkle |
| 4,933,970 A | | 6/1990 | Shamir |
| 4,995,082 A | | 2/1991 | Schnorr |
| 5,005,200 A | | 4/1991 | Fischer |
| 5,097,504 A | | 3/1992 | Camion et al. |
| 5,231,668 A | | 7/1993 | Kravitz |
| 5,276,737 A | | 1/1994 | Micali |
| 5,315,658 A | | 5/1994 | Micali |
| 5,557,346 A | | 9/1996 | Lipner et al. |
| 5,557,765 A | | 9/1996 | Lipner et al. |
| 5,633,928 A | | 5/1997 | Lenstra et al. |
| 5,640,454 A | * | 6/1997 | Lipner et al. .................. 380/21 |
| 5,647,000 A | | 7/1997 | Leighton |
| 5,796,830 A | | 8/1998 | Johnson et al. |
| 5,815,573 A | | 9/1998 | Johnson et al. |
| 5,937,066 A | * | 8/1999 | Gennaro et al. .............. 380/21 |

OTHER PUBLICATIONS

"Provably Secure and Practical Indentification Schemes and Corresponding Signature Schemes", Tatsuaki Okamoto, pp 32–53.
Federal Register / vol. 62, No. 92 / Tuesday, May 13, 1997 / Notices, pp. 26293, 26294.
R. Anderson, M. Roe, "The GCHQ Protocol and Its Problems", Eurocrypt '97 , pp. 134–148, Springer–Verlag 1997.
M. Bellare, P. Rogaway, "Optimal Asymmetric Encryption", Eurocrypt '94, pp. 92–111, Springer–Verlag, 1994.
D. Chaum, "Blind Signatures For Untraceable Payments".
D. Chaum, T.P. Pedersen, "Wallet Databases with Observers".
D. Denning, D. Branstad, "A Taxonomy for Key Escrow Encryption Systems", Communications of the ACM, v. 39, n. 3, 1996.
A. De Santis, Y. Desmedt, Y. Frankel, M. Yung, "How to Share a Function Securrely", ACM STOC 'ACM STOC '94, pp. 522–533, 1994.
Y. Desmedt, Y. Frankel, "Threshold cryptosystems", Crypto '89, pp. 307–315, Springer–Verlag, 1989.
Y. Desmedt, "Securing Traceability of Ciphertexts—Towards a Secure Software Key Escrow System", Eurocrypt '95 , pp. 147–157, Springer–Verlag, 1995.
W. Diffie, M. Hellman, "New Directions in Cryptography", IEEE Transactions on Information Theory, 22, pp. 644–654, 1976.
T. ElGamal, "A Public Key Cryptosystem and a Signature Scheme Based on Discrete Logarithms", Crypto '84, pp. 10–18, Springer–Verlag, 1985.

P. Feldman, "A Practical Scheme for Non–interactive Verifiable Secret Sharing", 28th annual FOCS, pp. 427–437, 1987.
A. Fiat, A. Shamir, "How to Prove Yourself: Practical Solutions to Identification and Signature Problems", CRYPTO '86, pp. 186–194, Springer–Verlag, 1987.
Y. Frankel, M. Yung, "Escrow Encryption Systems Visited: Attacks, Analysis and Designs", CRYPTO '95, Springer–Verlag, 1995.
R. Ganesan, "How To Use Key Escrow", Communications of the ACM, v. 39, n.3, p. 33, 1996.
S. Goldwasser, S. Micali, R. Rivest, "A Digital Signature Scheme Secure Against Adaptive Chosen–Message Attacks", SIAM Journal on Computing, vol. 17, n. 2, 1988.
IBM, SecureWay, key recovery technology document, available at http://www.ibm.com/Security/html/wp–keyrec.html (downloaded May 25, 1997).
N. Jefferies, C. Mitchell, M. Walker, "A Proposed Architecture for Trusted Third Party Services", Crytography: Policy and Algorithms, LNCS 1029, Springer, 1996.
J. Kilian, F. Leighton, "Fair Cryptosystems, Revisited", CRYPTO '95, pp. 208–221, Springer–Verlag, 1995.
L. Lacy, D. Mitchell, W. Schell, "CryptoLib: Cryptography in Software", AT&T Bell Labs, Crypto@research.att.com.
A. Lenstra, P. Winkler, Y. Yacobi, "A Key Escrow System with Warrant Bounds", CRYPTO '95, pp. 197–207, Springer–Verlag, 1995.
S. Micali, "Fair Public–Key Cryptosystems", CRYPTO '92, pp. 113–138, Springer–Verlag, 1992.
K. Nyberg, R. Rueppel, "Message Recovery for Signature Schemes Based on the Discrete Logarithm Problem".
T.P. Pedersen, "A Threshold Cryptosystem without a Trusted Party".
E. Verheul, H. Tilborg, "Binding ElGamal: A Fraud–Detectable Alternative to Key–Escrow Proposals", Eurocrypt '97 , pp. 119–133, Springler–Verlag, 1997.
S. Walker, J. Winston, "Priniciples for Use of Encryption and Key Recovery", available at http://www.tis.com/doc/products/recoverkey/recoverkey.html (downloaded May 25, 1997) .
A. Young, M. Yung, "Kleptography: Using Cryptography Against Cryptography", Eurocrypt '97 , pp. 62–74, Springer–Verlag, 1997.
"Digital Systems", CRC Handbook of Applied Cryptography, Ch. 11 pp. 424–444.
"Digital Systems", CRC Handbook of Applied Crytography, Ch 11, pp. 445–464.
"Digital Systems", CRC Handbook of Applied Crytography, Ch 11, pp. 465–481.

* cited by examiner

AUTO-RECOVERABLE AND AUTO-CERTIFIABLE CRYPTOSYSTEMS WITH RSA OR FACTORING BASED KEYS

RELATED APPLICATIONS

This application is related to, and is a continuation-in part of, our applications Ser. No. 08/864,839, filed May 28, 1997 now U.S. Pat. No. 6,202,150, Ser. No. 08/878,189, filed Jun. 18, 1997 (now U.S. Pat. No. 6,122,742, granted Sep. 19, 2000), and Ser. No. 08/920,504 now U.S. Pat. No. 6,243,466, filed Aug. 29, 1997, and to Ser. No. 09/218,219, filed Dec. 22, 1997.

BACKGROUND—Field of Invention

The field of this invention is cryptography. This invention relates to cryptosystems, and in particular to the escrowing and recovering of cryptographic keys and data encrypted under cryptographic keys. The escrow and recovery process assures that authorized entities like law-enforcement bodies, government bodies, users, and organizations, can when allowed or required, read encrypted data. The invention relates to cryptosystems implemented in software or in hardware. In particular, the invention relates to the generation of user public keys based on composite numbers and on the hardness of number factoring, and relates to implementing a hierarchical key escrow system.

BACKGROUND—Description of Prior Art

Public Key Cryptosystems (PKC's) allow secure communications between two parties who have never met before. The notion of a PKC was put forth in (W. Diffie, M. Hellman, "New directions in cryptography", IEEE Transactions on Information Theory, 22, pages 644–654, 1976). This communication can take place over an insecure channel. In a PKC, each user possesses a public key E and a private key D. E is made publicly available by a key distribution center, also called certification authority (CA), after the registration authority verifies the authenticity of the user (its identification, etc.). The registration authority is part of the certification authority. D is kept private by the user. E is used to encrypt messages, and only D can be used to decrypt messages. It is computationally impossible to derive D from E. To use a PKC, party A obtains party B's public key E from the key distribution center. Party A encrypts a message with E and sends the result to party B. B recovers the message by decrypting with D. The key distribution center is trusted by both parties to give correct public keys upon request. A PKC based on the difficulty of computing discrete logarithms was published in (T. ElGamal, "A Public-Key Cryptosystem and a Signature Scheme Based on Discrete Logarithms", CRYPTO '84, pages 10–18, Springer-Verlag, 1985).

The current invention relates to key escrow systems. Prior methods for conducting key escrow are U.S. Pat. No. 5,276,737, and 5,315,658 which are due to Micali (1994). In these patents Micali discloses a Fair Public Key Cryptosystem (FPKC) which is based on the work of P. Feldman (28th annual FOCS). The FPKC solution is not as efficient in terms of use as Auto-Recoverable and Auto-Certifiable Cryptosystems. Furthermore, It has been shown that the Fair RSA PKC does not meet certain needs of law enforcement (J. Kilian, F. Leighton, "Fair Cryptosystems Revisited", CRYPTO '95, pages 208–221, Springer-Verlag, 1995), since a shadow public key cryptosystem can be embedded within it. A shadow public key system is a system that can be embedded in a key escrow system that permits conspiring users to conduct untappable communications. Kilian and Leighton disclose a Fail-safe Key Escrow system. This system has the drawback that it requires users to engage in a costly multi-round protocol in order to generate public/private key pairs. Other key escrow systems with similar inefficiencies are by De Santis et al., Walker and Winston (TIS), and the IBM SecureWay document. These solutions propose session-level escrow which requires changes in communication protocols. A "Fraud-Detectable Alternative to Key-Escrow Proposals" based on ElGamal has been described in (E. Verheul, H. van Tilborg, "Binding ElGamal: A Fraud-Detectable Alternative to Key-Escrow Proposals", Eurocrypt '97, pages 119–133, Springer-Verlag, 1997). This system, called Binding ElGamal, provides for session level key recoverability, and makes no provision for preventing users from encrypting messages using the provided une-scrowed public key infrastructure prior to using the Binding ElGamal system. Hence, it permits conspiring criminals to conduct untappable communications. Binding ElGamal also imposes a large amount of communication overhead per communications session. An overview of key escrow schemes appears in (D. Denning, D. Branstad, "A Taxonomy for Key Escrow Encryption Systems,"Communications of the ACM, v. 39, n. 3, 1996). In (N. Jefferies, C. Mitchell, M. Walker, "A Proposed Architecture for Trusted Third Party Services", Cryptography: Policy and Algorithms, LNCS 1029, Springer, 1996) and (R. Anderson, "The GCHQ Protocol and Its Problems", Eurocrypt '97, pages 134–148, Springer-Verlag, 1997) a trusted third party approach to escrow is described where the trusted third parties of the participating users are involved in every session key establishment stage, and hence provides for another cumbersome solution as well.

In the pending U.S. Pat. Nos. 08/864,839, 08/878,189, and "Auto-Recoverable And Auto-Certifiable Cryptosystems with Fast Key Generation" filed Aug. 29, 1997 (by Young and Yung), Auto-Recoverable and Auto-Certifiable public key cryptosystems were disclosed that have the following properties. Users of the system can generate a public/private key pair and a certificate of recoverability. This certificate of recoverability can be used to both recover the private key by the escrow authorities, and verify that the private key is recoverable. The present invention is a new Auto-Recoverable and Auto-Certifiable key escrow solution. The main restriction of the prior Auto- Recoverable and Auto-Certifiable cryptosystems that were proposed is that it is not possible to generate user public and private keys that are based on the difficulty of factoring. Such cryptosystems based on a multiple of two large prime numbers, for example, are popular. Inn particular the RSA system by Rivest et. al (Rivest 1983) is very popular. The previous Auto-Recoverable and Auto-Certifiable systems based users'keys on the hardness of the problem of computing discrete logarithms. Indeed, it could be the case that computing discrete logs is not as hard as is currently believed, but that factoring is hard. Thus for this reason, there is a significant advantage to an Auto-Recoverable and Auto-Certifiable cryptosystem based on the difficulty of factoring, as in the present invention. The present invention discloses an Auto-Recoverable and Auto-Certifiable cryptosystem in which the public key of the escrow authorities and the public keys of the users are based on the hardness of factoring composites. In another embodiment the escrow authorities keys are based on the discrete log problem.

The present invention also introduces a new notion, the notion of a key escrow hierarchy which is a method with new functionality. We disclose a method for implementing a key escrow hierarchy that takes the form of a tree. This tree has the property that any node has the ability to recover the communications of nodes of the subtree for which it is the root. Thus, the root node of the entire tree is able to recover the communications of all users of the system. Such a system is ideal for implementing national and multinational Public Key Infrastructures (PKI). For instance, a national PKI for the U.S. could be implemented as a depth-3 tree. The federal government could be the root. The state governments could be the middle nodes, and the residents of each state could be the leaves. This would allow the federal government to decrypt all communications, and would restrict the state governments to only be able to decrypt the communications of the states own residents.

Both Binding ElGamal and the Auto-Recoverable and Auto-Certifiable Cryptosystems solutions employ the use of non-interactive proofs. More specifically, they employ the Fiat Shamir heuristic which is disclosed in (A. Fiat, A. Shamir, "How to Prove Yourself: Practical Solutions to Identification and Signature Problems", CRYPTO '86, pages 186–194, Springer-Verlag, 1987). It is known in the art how to replace non-interactive proofs by interactive proofs. The variant of proofs introduced by our mechanism is a proof that combines a zero-knowledge methodology with explicit encryption of values to a third party.

SUMMARY OF THE INVENTION

The present invention provides a method to verify that information that can be used to recover a user generated private key is contained within an encryption under the public key of the escrow authorities. Also, this method does not involve a lot of overhead. Furthermore, this verification can be performed by anyone in possession of the escrow authorities public key. The present invention can replace a public key infrastructure which is based on users' keys based on factoring (e.g., RSA keys as in Rivest 1983) without changing the encryption and decryption functions since the keys generated are compatible with factoring based keys. The present invention is also compatible with a usual Public Key Infrastructure and does not require other changes (like changes of communication protocols and computations). The present invention consists of a setting up process and three functions which process signals in different ways. The functions are key generation, key verification, and key recovery. In the setup process of the prefered embodiment, the participants agree upon a set of initial public parameters and the authorities generate an escrowing public key and corresponding private keys. The initial parameters and the escrowing public key are the public parameters of the system. The escrowing authorities, Certification Authority (CA), and users of the system all have access to the public parameters. In the key generation process, the method generates a user's public/private key pair, and a certificate of recoverability which is a string of information which includes encryptions of information that allows the recovery of the user's private key, encrypted under the escrowing public key. The signal information containing the user's public key, and the certificate of recoverability can be transmitted to any entity. In the verification process, the user transmits this signal to the verifier. The verification process takes the input signal, processes it, and outputs either true or false. A result of true indicates that the user's private key is recoverable from the certificate of recoverability by the escrow authorities. A result of false indicates that the private key is not recoverable. The invention is designed such that it is intractable for the user to generate a public key, and certificate of recoverability such that the key is not escrowed and such that it passes the verification process with a result of true. In the prefered embodiment, the users certify their public keys with the registration authority of the certification authority (CA) who then signs their public key after successful verification. A public key together with a CA's signature on a string that contains the public key, the user's identity, and other information, constitutes a certified public key. The other information can include the certificate of recoverability in the present invention. It can also include the message digest of the certificate of recoverability. In more detail, upon receiving the user's public key, and certificate of recoverability, the CA verifies that the corresponding private key is recoverable. If it is, (namely, the verification process outputs true) the public key is certified and/or made publicly available by the CA. The CA keeps a copy of the certificate of recoverability, perhaps in encrypted form under its own key. The user is only required to keep his private key and to have access to the public key database containing public keys of other users as in a typical PKI. In the recovery process, the escrow authorities use the user's certificate of recoverability and public key, which is obtained from the CA, as an input signal. The escrow authorities process the certificate of recoverability, and the corresponding user's private key is the resulting output signal. When the escrow authorities are implemented in tamper-proof hardware, it is possible to output decryptions of messages encrypted under the private key rather than the private key itself.

The present invention is useful in any environment that demands the recovery of private keys, or keys encrypted under these keys, or information encrypted under these keys. Such environments arise in law enforcement nationally and internationally, in the business sector, in secure file systems, on the Internet, in Certified Mail services, etc. The successful escrowing of private keys implies the successful escrowing of public key encrypted information, and hence the present invention has many applications.

The present invention is robust with respect to any underlying technology since it can be implemented in both hardware and software. When implemented in software it can be easily scrutinized to insure that it functions as desired and to insure that it does not compromise the security of its users. The software implementation allows for fast and easy dissemination of the invention, since it can be disseminated in source code form over diskettes or over a computer communication network. The present invention is also communication efficient. At most, one, two, or three message exchanges suffice for the various embodiments of the present invention. The signals can be processed quickly and the signals themselves constitute a small amount of information. The invention does not require changes in communication protocols used in typical unescrowed PKI's (e.g., session key establishment, key distribution, secure message transmission, etc.). The invention is therefore compatible with typical PKI's. The present invention thus provides a very efficient way of escrowing and recovering cryptographic keys. The present invention does not require changes in header information of messages, content of messages, or additional messages outside the PKI protocols, and as mentioned above does not require changes of cryptographic encryption and decryption in systems based on RSA or factoring based keys.

THE DRAWING

The present invention will be described with reference to the accompanying FIGS. 1–7.

Figure 3:
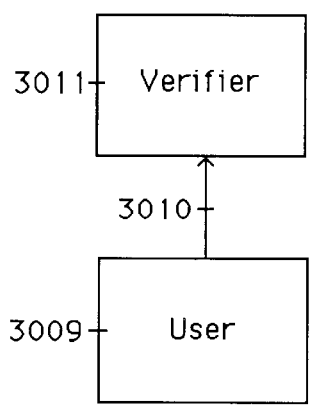

FIG. 3. is a data flow diagram of the process of verifying the recoverability of a private key.

Figure 4:
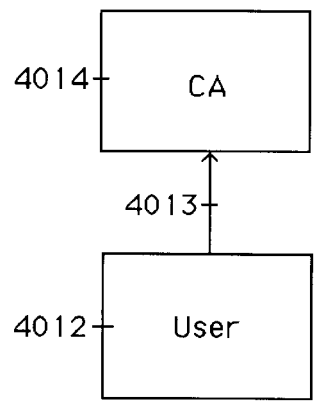

FIG. 4 is a data flow diagram of the process of registering a key using the invention.

Figure 5:
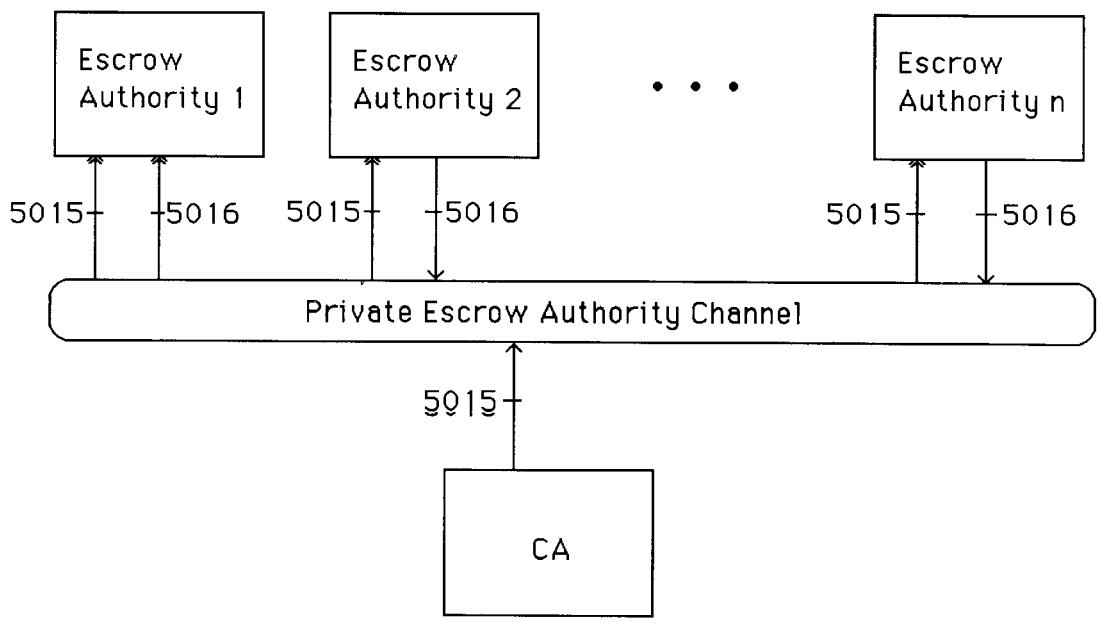

FIG. 5 is a data flow diagram of the process of private key recovery by the escrow authorities.

Figure 6:
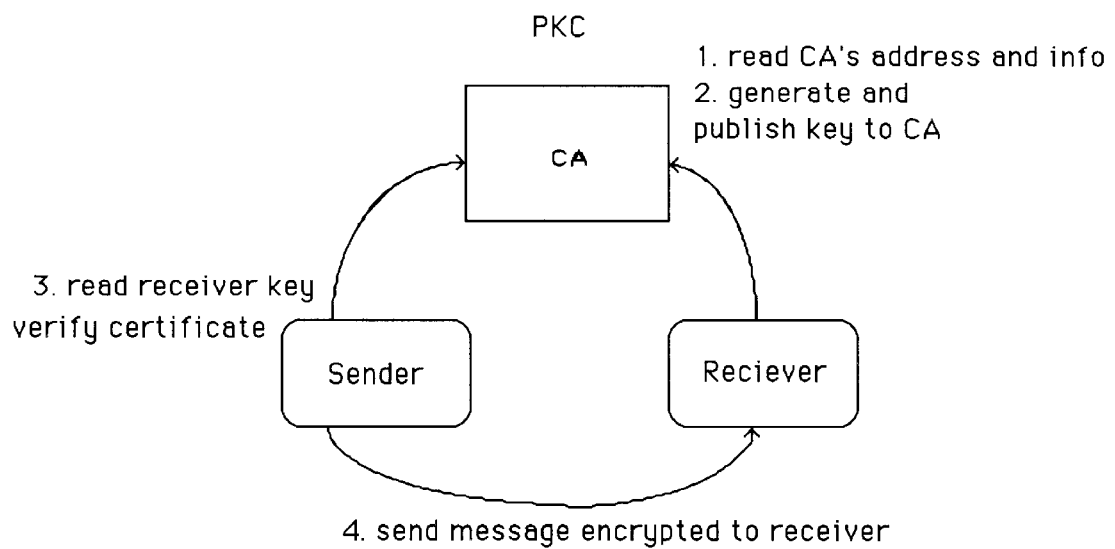
Figure 7:
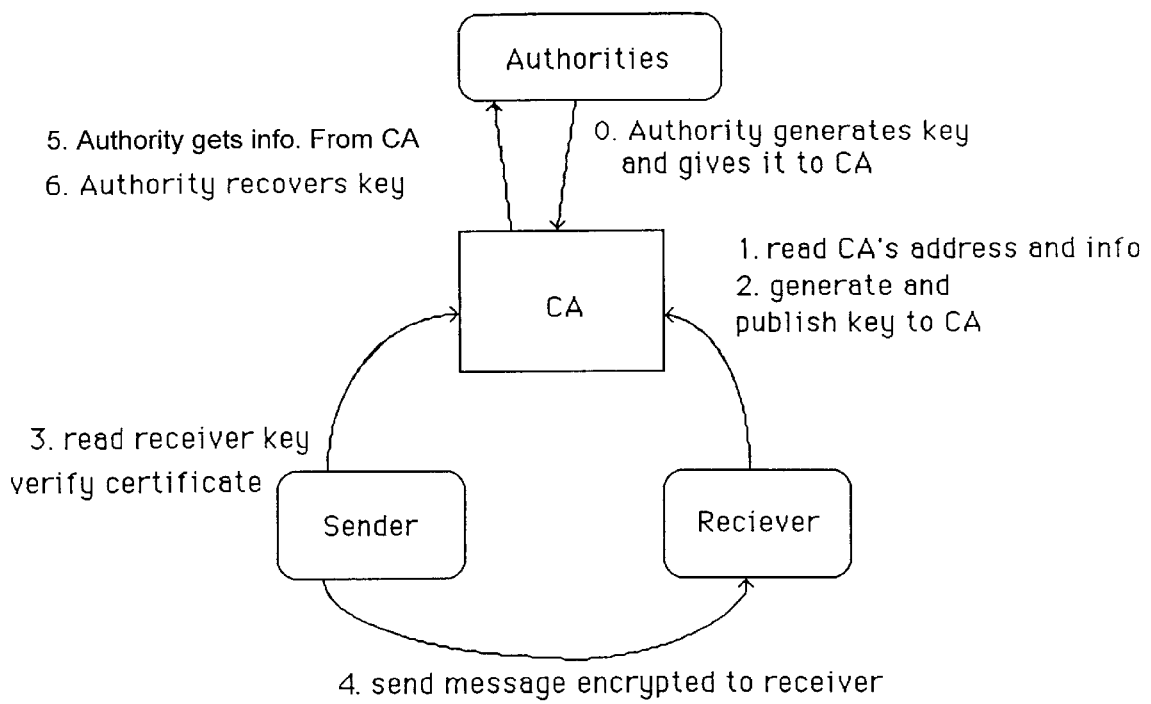

FIG. 6 describes a generic public key system and its main components and operations FIG. 7 describes the escrowable public key system which results by employing the present invention and its main components and operations.

Figure 8:
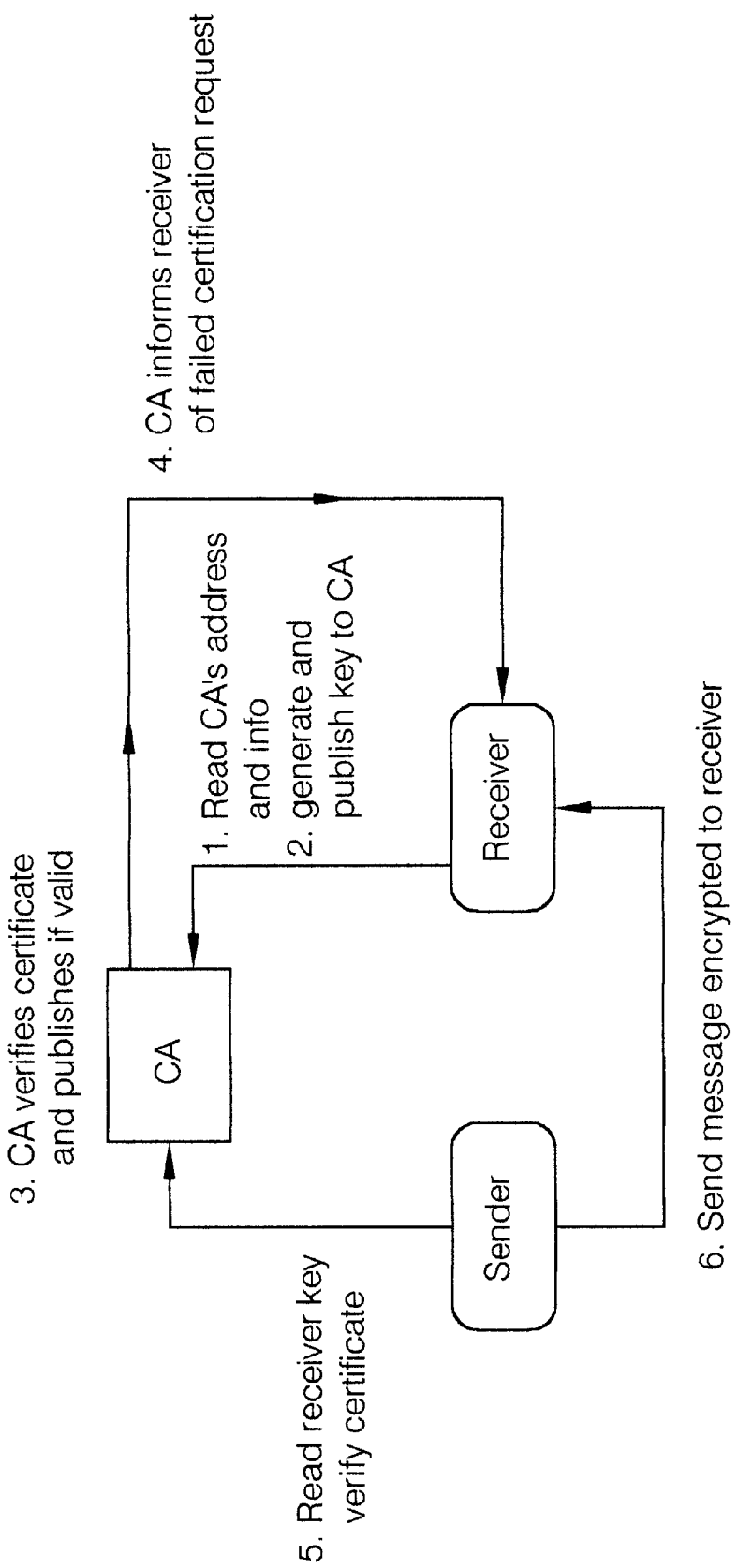

FIG. 8 is a schematic representation of the procedure by which users are informed of failed certification requests.

Figure 9:
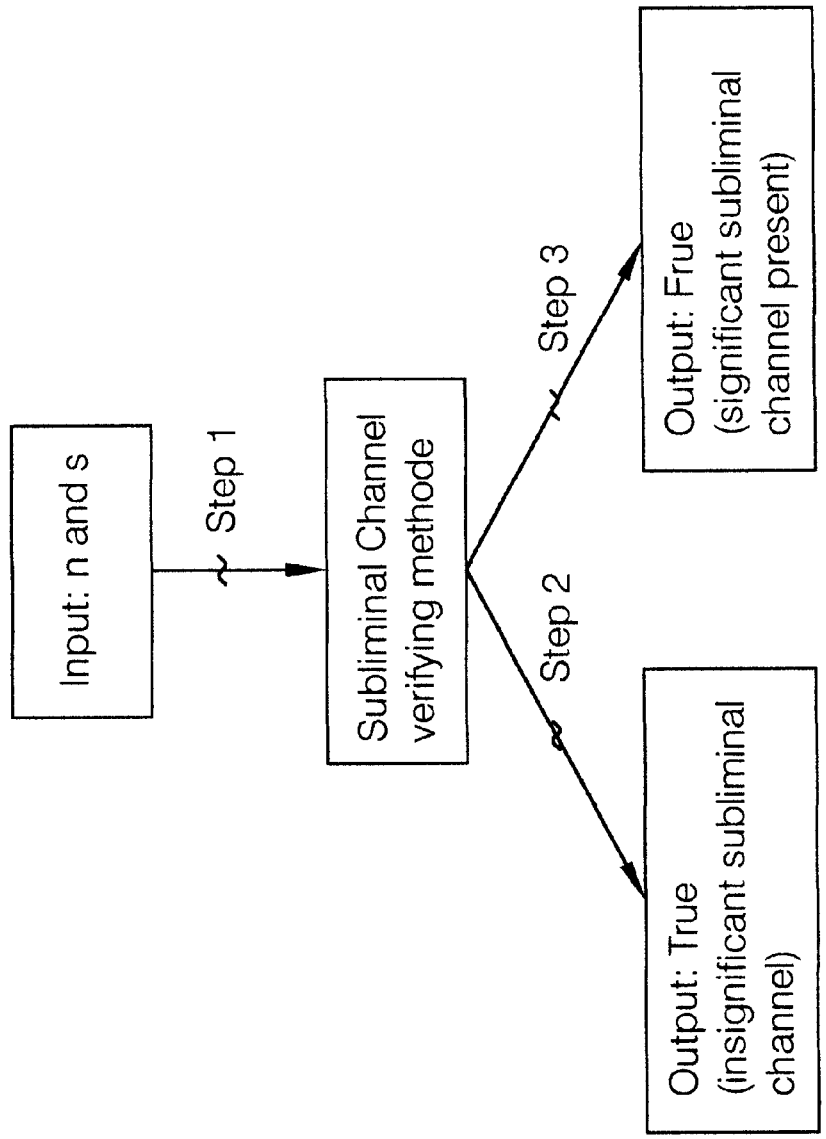

FIG. 9 is a schematic representation of a procedure for checking for subliminal channel abuse.

Figure 10:
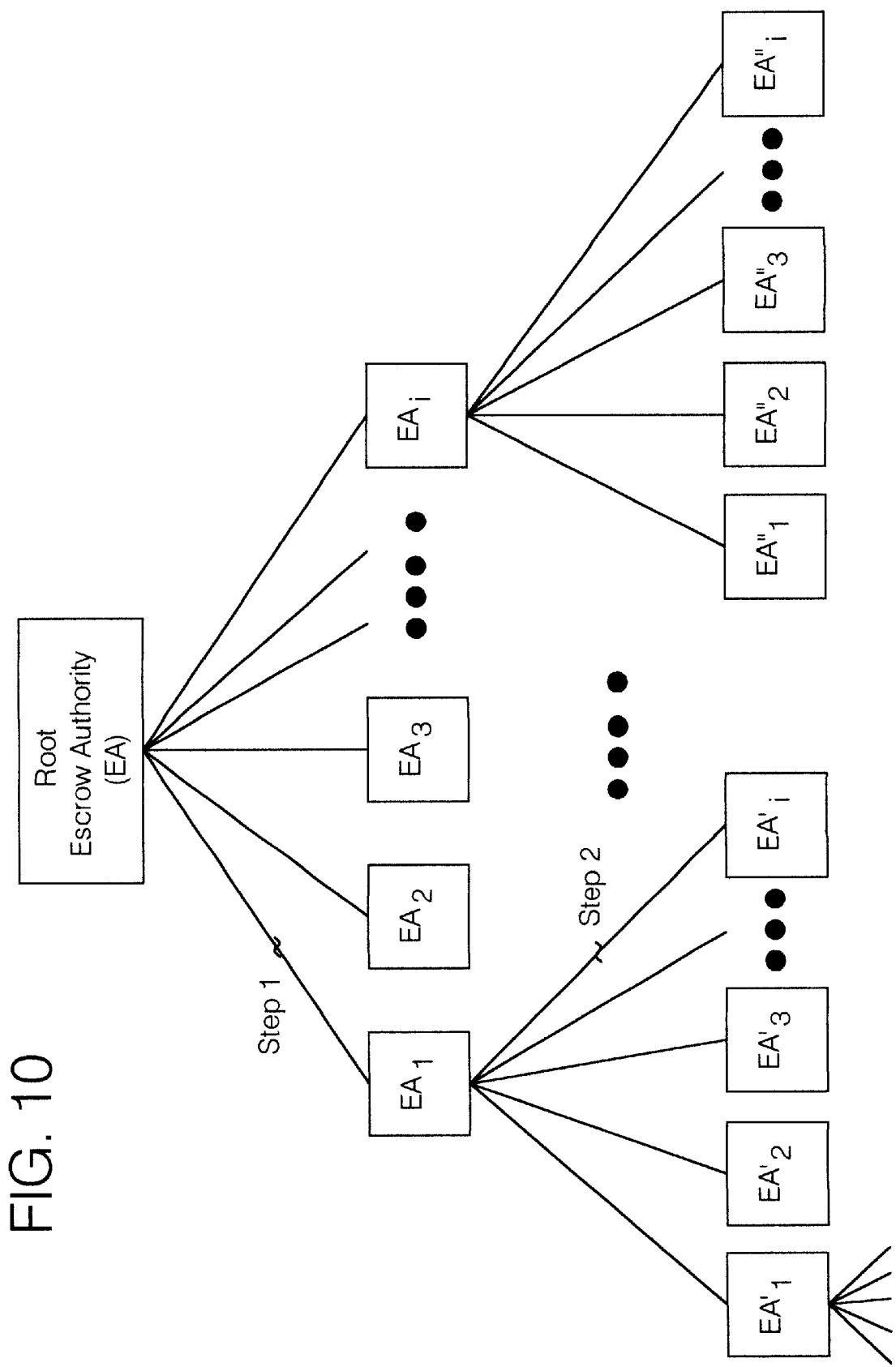

FIG. 10 is a schematic representation illustrating the decryption capabilities of a Root Escrow Authority and levels of nodes below.

DESCRIPTION OF THE INVENTION

The following is a description of the prefered embodiment of the present invention.

Variations on the prefered embodiment will accompany the description of the prefered embodiment wherever applicable. For convenience in the presentation, the hashing algorithm selected is SHA (Schneier 2nd edition, pages 442–445), though any cryptographic hashing algorithm will suffice in its place. In the prefered embodiment, parameters are chosen uniformly at random from their respective groups. Alternate embodiments include alterations of the probability distributions from which such values are chosen. Such choices based on random number generators or pseudo-random generators are available in the art.

Figure 1:
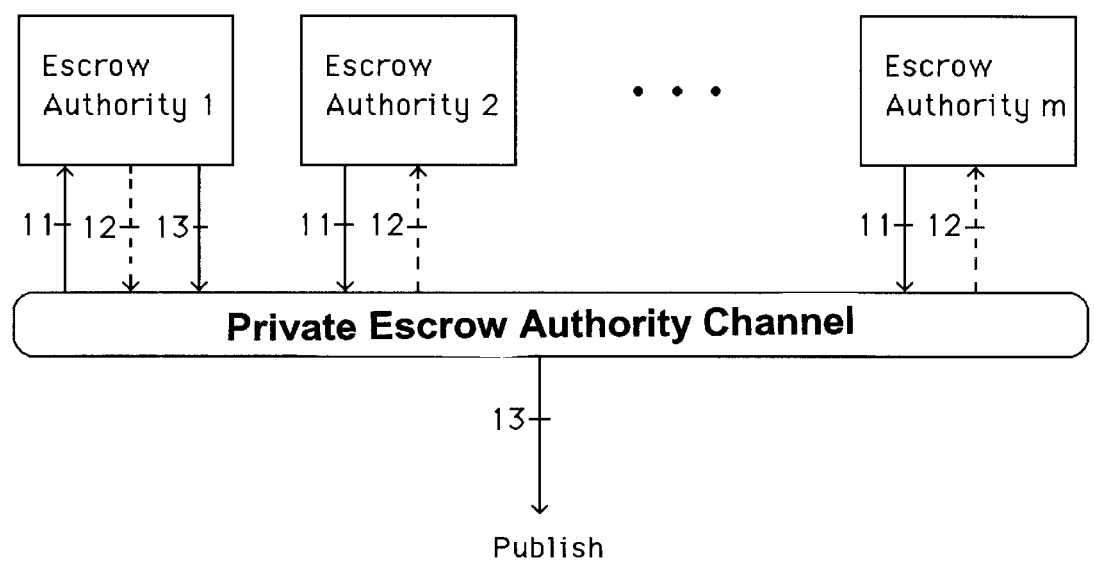
FIG. 1 is a data flow diagram of the process of setting up the method of the invention for use with m escrow authorities.

The system setup of the prefered embodiment shown in FIG. 1 initiates the cryptosystem. In the prefered embodiment, the escrow authorities generate a shared integer $N=p'q'$, where $p'$ and $q'$ are prime such that $\gcd(E,(p'-1)(q'-1))=1$. Here E is the public RSA exponent. N is a k-bit integer, where k is even. The method described in (A. De Santis, Y. Desmedt, Y. Frankel, M. Yung, "How to Share a Function Securely", ACM STOC '94, pages 522–533, 1994) can be used to employ the shared values $D_1, D_2, \ldots$, which are the shares of the private exponent, corresponding to the public exponent E. It is preferred that $p'$ and $q'$ be strong primes, to thwart known attacks. The valued N and E are made public and N's factorization is kept private.

Figure 2:
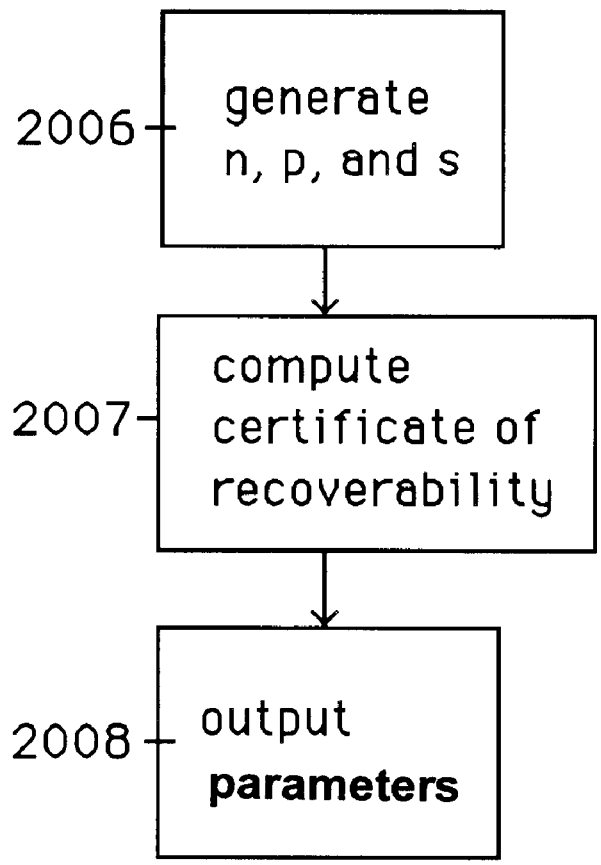
FIG. 2 is a flow chart of the basic steps of the process of generating a public/private key pair and certificate of recoverability using the invention.

FIG. 2 is a diagram showing the process of how a user's system generates a public/private key pair and a certificate of recoverability. Having obtained (and verified as much as possible) the signal N and E that is made available to users by the escrow authorities, the user system proceeds to generate a public key n and public encryption exponent e for the user. The user system chooses a random string s' such that $s', s'+MAX-1 \epsilon \{0,1\}^{k/2}$. Here MAX is a small integer, say 32768. The user system computes $U_w=H(s'+w)$ for $0 \leq w \leq MAX$. H is a pseudo-random one-way function with a domain of $\{0,1\}^{k/2}$. The user system then chooses a k/2 bit strong prime p randomly such that $\gcd(e,p-1)=1$. The user system also chooses a value $\epsilon_R \{0,1\}^{k/2}$. The user system solves for $q_w$ in the equation $[U_w][rnd]=pq_w+r$ for $0 \leq w \leq MAX$. The left side of this equation is the integer formed by concatenating the two bitstrings $U_w$ and rnd. For each $q_w$ that is a strong prime such that $\gcd(e, q_w-1)=1$, the user system checks that $pq_w<N$. If this holds for one or more of the $q_w$, the system sets $q=q_w$ for the least w and $s=s'+w$. Otherwise, s' is chosen again and the algorithm is repeated. This algorithm is similar to the SETUP attack against RSA keys (A. Young, M. Yung, "Kleptography: Using Cryptography Against Cryptography", Eurocrypt '97, pages 62–74, Springer-Verlag, 1997) and actually intends to prevent attacks of these types by minimizing what is known in the art as "subliminal channels". This process of generating n, p, and s is depicted in step 2006 of FIG. 2.

The system then proceeds to step 2007 and computes a certificate that can be used by any interested party to verify that the user's "private key" p (or q) can be recovered from the certificate of recoverability P. P is constructed according to the following algorithm:

1. P=( )
2. for i=1 M do
3. choose $r_{i,1} \epsilon_R Z_n^*$
4. $Q_i = r_{i,1}^2 \bmod n$
5. compute $r_{i,2}$ to be a root of $Q_i \bmod n$ s.t. $r_{i,2} \neq r_{i,1} \bmod n$
6. $C_{i,1} = r_{i,1}^E \bmod N$
7. $C_{i,2} = r_{i,2}^E \bmod N$
8. add $(Q_i, C_{i,1}, C_{i,2})$ to the end of P
9. val=H(P)
10. set $b_1, b_2, \ldots, b_M$ to be the M least significant bits of val, where $b_i \epsilon Z_2$
11. for i=1 to M do
12. $Z_i = r_{i,j}$ where $j=1+b_i$
13. add $Z_i$ to the end of P
14. add s to the end of P Thus, $P = ((Q_1, C_{1,1}, C_{1,2}), \ldots, (Q_M, C_{M,1}, C_{M,2}), Z_1, \ldots, Z_{M,s})$. Here s is the seed used to find the upper order bits of n. Note that $Q_i$ is a quadratic residue mod n, and the $C_{i,j}$'s are the RSA encryptions under N of pairs of ambivalent roots of $Q_i$ (a pair which is neither identical nor a pair in which one is the negation of the other modulo n). The encryption is actually a deterministic commitment to the roots and the encryption may include some preprocessing of the value (using cryptographic hash functions, reversible operations, and stretching the encryption block into several blocks) which are known in the art; we will assume encryption only with no preprocessing in the following description. H is a suitable public one-way hash function (e.g., SHA), so the $b_i$'s can be recovered from P. The values for b are the challenge bits, and this method of finding them is known as the Fiat-Shamir Heuristic. The user system outputs (n,p,P) in step 2008. Note that the user has the option to interactively prove that his or her private key p is recoverable by the escrow authorities. This will be addressed in more detail later. M is a large enough parameter of security (e.g., M=50).

The description of the embodiment has thus far explained how the system is setup for use by the CA and authorities, and how the system is used by users (potential receivers) to generate public/private key pairs and certificates of recoverability. These certificates are strings showing to anyone presented with them that the private key corresponding to the public key generated is recoverable by the escrow authorities using P. The following describes how the invention is used by the user to prove to a verifier that p is recoverable from P. This process is depicted in FIG. 3. The verifier can be the CA, an escrow authority, or anyone else who knows the system parameters.

The verification process of FIG. 3 is as follows. In step 3009, the user generates a public/private key pair, and a certificate using the invention as described above. In step 3010, the user transmits a signal containing these parameters to a verifier. In step 3011 the verifier uses this signal to verify whether or not the user's private key is recoverable by the escrow authorities. In this process, the verifying system takes n, the corresponding certificate P, and the escrowing public key N and E. The verifying system first checks that n<N (this assumption is not necessary since one can stretch blocks in the commitment encryptions as explained above, but this assumption simplifies the design). Let y denote the integer corresponding to the k/2 upper order bits of n. The verifying system makes sure that either H(s)=y or that H(s)=y+1. The verifying system checks that all of the values in P lie in the correct sets. The verifying system also checks that the values $C_{ij}$ are not equal for all i and j. The verifying system checks that none of the $Q_i$ are the same for all i. If any of these verifications fail, then false is returned. This check for subliminal channel abuse is depicted in FIG. 9. In step 1 of FIG. 9 the values n and s are input into the subliminal channel certification method. Step 2 is reached if and only if the verifying method concludes that there is no significant subliminal channel present. This corresponds to H(s) equaling y or y+1. Step 3 is reached if and only if the verifying method concludes that a subliminal channel is present. This corresponds to H(s) not equaling y nor y+1. The verifying system then computes $b_1, b_2, \ldots, b_M$ in the same way as in the certificate generation process. For i=1 to M, the verifying system verifies the following things:

The verifying system returns true as long as all the verifications pass and as long as all three criterion are satisfied for $1 \leq i \leq M$. The invention may take subsequent action and indicate to the verifier that the public key is invalid in the event that false is returned. Similarly, the verifying system may inform the verifier of a validation that passes (the verifying system returns true).

In FIG. 4, the user certifies his or her public key with the CA. In step 4012 of this process, the user generates his or her public key and certificate of recoverability, as previously described. The user transmits this signal to the CA. This corresponds to step 4013 of FIG. 4. In step 4014 the CA acts as a verifier and verifies that the user's private key is recoverable by the escrow authorities.

So far, steps 4012 through 4014 are identical to steps 3009 through 3011 in the key verification process of FIG. 3. However the CA, in addition, will make keys that pass the verification process available to others upon request and/or certify them. If the user's public key fails the verification process, then either the certification attempt is ignored, or alternatively the user is notified of the failed certification attempt.

Depending on the demands of the environment in which the invention is used, users may be required to submit extra information in order to register a public key and to certify that they know the private key portion without divulging it. Such information could be a password, social security number, previously used private key, etc. In the case that the CA is a trusted entity, the CA can simply digitally sign the user's public key together with the user's name and additional information, and make the key along with the CA's signature on this information available on request. If the CA is not trusted (which is not the typical assumption in PKI), then the certificate should be stored in the public file and the certificate together with the certificate of recoverability should be given to the escrow authorities, who in turn can insure recoverability. This completes the description of the public key certification process. We note that the CA keeps the certificate of recoverability, possibly in encrypted form under its own key with authentication information for integrity.

The last process to describe is the private key recovery process. This process is depicted in FIG. 5. In this process, the invention is used by the m escrow authorities to recover the user's private key based on P. In this process, all m of the escrow authorities obtain n and P, as depicted in step 5015 of FIG. 5. In an alternate embodiment the CA transmits n and P and/or other parameters to one or more of the authorities. Thus they are already in possession of n and P. At this point escrow authorities use a subset of their shares $D_1, D_2, \ldots, D_m$ to decipher P to open all of the unopened $C_{i,j}$. This is accomplished by having escrow authority i recover the ith shares of the user's private key. In this process, escrow authority i extracts the M values for the unopened $C_{i,j}$ from P and decrypts them using $D_j$. The resulting values are pooled with the values from the other escrow authorities, as depicted in step 5016 of FIG. 5. The pool is then used by the authorities to decrypt all of the unopened values $C_{i,j}$ from P. Thus all of the plaintexts corresponding to all $C_{i,j}$ are known to the escrow authorities. There are alternative methods in the art for recovering the roots corresponding to the unopened $C_{i,j}$, so that the unopened roots are represented distributively among the authorities. The escrow authorities check each $C_{i,1}$ and $C_{i,2}$ for a pair of ambivalent roots of $Q_i$. Once such a pair is found, the gcd algorithm is used to output a nontrivial factor of n, using a method well known in the art.

Instead of executing the last algorithm which recovers the factors in software, it can be done in a tamper-proof environment. The environment gets the key n (and the public exponent which is typically a companion of n), and a message encrypted under that key. The above algorithm is executed and the decryption key is derived from the factors of n (in one of the ways known in the art). The decryption key is applied to the ciphertext, and the cleartext is output by the environment.

What has been described is an Auto-Recoverable and Auto-Certifiable (ARC) cryptosystem where the public key of the escrow authorities and the public key of the user are composite integers. The users of such a cryptosystem employ the public key system in a way that is identical to a typical PKI with composite number based keys, for secure communications. This is demonstrated schematically in FIGS. 6 and 7. FIG. 6 is a typical public key cryptosystem in a PKI environment. The following are the steps that are followed by the users. (1) The user first reads the CA's information and address. (2) The user generates a public/private key pair and sends the public key to the CA. The registration of the authority in the CA verifies the identity of the user, and publishes the public key together with the CA certificate on that key, identifying the user as the owner of that key. (3) For another user to send a message to that user, the public key is read from the CA's database and the certificate is verified. (4) Then, the message is encrypted under the public key and sent. FIG. 7 schematically describes the ARC cryptosystem. The additional operations are as follows. (0) The authority generates the escrowing public key and gives it to the CA. Steps 1 and 2 are analogous, except that a proof is sent along with the public key. Steps 3 and 4 are the operation of the system and are identical. Steps 5 and 6 describe the case in which keys are recovered from escrow. (5) The escrow authority gets information from the CA. (6) The escrow authority recovers the user's private key.

The method by which users are informed of failed certification requests is depicted in FIG. 8. The steps are as follows: (1) the user reads the CA's address and information. (2) The user (or receiver in this case) generates and publishes a key to the CA. (3) The CA verifies the key and the corresponding certificate and publishes the key only if the certificate is valid. (4) The CA informs the receiver in the event of a failed certification request. (5) The sender reads the receiver key from the CA and verifies the receivers certificate. (6) The sender encrypts a message and sends it to the receiver.

The authorities can require that that the certificate of recoverability be sent along with the public key so that the user's parameters can first be verified using the verification process by the authorities as well. This completes the description of the primary embodiment and variations thereof.

We will now describe our secondary embodiment of this invention. In this embodiment, the users of the system generate composite public keys as before, except the escrowing public key of the escrow authorities is an ElGamal public key. In this system, the escrow authorities have the shared public key $Y=g^X$ mod Q. The private key X is shared additively among the escrow authorities (other sharing or a single authority are possible variations known in the art, as well as multiple authority keys where each user can choose a subset of authorities by multiplying their public keys). Q is a large strong prime and g is a generator of the domain $Z_Q$. The user system generates n and s in the same way as before, except that n <Q instead of n<N. The construction of P is the same as before, except that we don't use RSA to encrypt $r_{i,1}$ and $r_{i,2}$. Note that straightforward ElGamal encryption using (Y,g,Q) won't suffice to form the commitments. To see this, note that unlike RSA, ElGamal is a probabilistic PKCS and does not constitute a permutation. The prover could thus encrypt the same root of $Q_i$ in $C_{i,1}$ and $C_{i,2}$, and there would be no way to know this without opening both values. The solution to this problem is quite subtle. The following is the modified algorithm for computing the $Q_i$'s, $C_{i,j}$'s, and $Z_i$'s in the user system (its security will be based on both discrete logarithm and factoring which are needed to be secure for this embodiment to work).

1. P=( )
2. for i=1 to M do
3. choose a large prime $r_{i,1} \in_R Z_n^*$
4. $Q_i = r_{i,1}^2$ mod n
5. Let t and t' be roots of $Q_i$ s.t. they are ambivalent roots (i.e., t,t'≠$r_{i,1}$, $-r_{i,1}$ mod n)
6. set $r_{i,2}$=t if t or t/2 is a large strong prime
7. set $r_{i,2}$=t' if t' or t'/2 is a large strong prime
8. if none of t,t',t/2,t'/2 are large strong primes go to step 3
9. choose $k_{i,1} \in_R Z^*_{Q-1}$ s.t. Y raised to the $k_{i,1}$ power mod Q is a large strong prime
10. $A_{i,1}$=g raised to the $k_{i,1}$ power mod Q
11. $B_{i,1}$=(Y raised to the $k_{i,1}$ power mod Q)($r_{i,1}$)
12. $C_{i,1}$=($A_{i,1}$,$B_{i,1}$)
13. choose $k_{i,2} \in_R Z^*_{Q-1}$ s.t. Y raised to the $k_{i,2}$ power mod Q is a large strong prime
14. $A_{i,2}$=g raised to the $k_{i,2}$ power mod Q
15. $B_{i,2}$=(Y raised to the $k_{i,2}$ power mod Q)($r_{i,2}$)
16. $C_{i,2}$=($A_{i,2}$,$B_{i,2}$)
17. add ($Q_i$,$C_{i,1}$,$C_{i,2}$) to the end of P
18. val=H(P)
19. set $b_1,b_2,\ldots,b_M$ to be the M least significant bits of val, where $b_i \in Z_2$
20. for i=1 to M do
21. $Z_i = k_{i,j}$, where j=1+$b_i$
22. add $Z_i$ to the end of P
23. add s to the end of P Note that the $C_{i,j}$ are not ElGamal encryptions or RSA encryptions. They are a hybrid of both. The value $A_{i,j}$ is the same as the A in an ElGamal encryption, but B is quite different. The value B is not reduced modulo Q. Instead, it is a composite, as in RSA. We make sure that Y raised to the $k_{i,j}$ power mod Q is a strong prime. We also make sure that $r_{i,j}$ is either a strong prime or two times a strong prime. Thus, B is either an RSA modulus or two times an RSA modulus. The plaintext $r_{i,j}$ in this encryption is in fact one of the large prime factors of B, and is also a root of $Q_i$ mod n. We may relax the requirement regarding $r_{i,2}$ (the root ambivalent to $r_{i,1}$) and allow it to be a large prime multiplied by a small number smaller than some bound (say, 1000). We may also relax the need for strong primes, when the numbers chosen are of size large enough (say of size 2048 bits).

The verifying system is a bit different than before. The verifying system first checks that n<Q. Let y denote the integer corresponding to the k/2 upper order bits of n. The verifying system makes sure that either H(s)=y or that H(s)=y+1. The verifying system checks that all of the values in P lie in the correct sets. For example, the verifying system checks that $B_{i,j}$<Qn. The verifying system also checks that the values $A_{i,j}$ are not equal for all i and j. The verifying system computes the gcd for each pair of values $B_{i,j}$, and makes sure that none of the gcd's exceeds 2. The verifying system also checks that all of the $B_{i,1}$'s are odd. The verifying system checks that none of the $Q_i$ are equal for all i. If any of these verifications fails, then false is returned. The verifying system then computes $b_1,b_2,\ldots,b_M$ in the same way as in the certificate generation process. The verifying system computes $r_{i,j}=B_{i,j}/$(Y raised to the $k_{i,j}$ power mod Q), where j=1+$b_i$, and returns false if the remainder isn't zero or if $r_{i,j}$ where j=1+$b_i$ isn't less than n. If $r_{i,1}$ is opened, the verifying system checks that it is a large strong prime. If $r_{i,2}$ is opened, the verifying system checks that it is a large strong prime or two times a large strong prime. For i=1 to M, the verifying system verifies the following things:
1. $r_{i,j}^2 = Q_i$ mod n, where j=1+$b_i$
2. $-r_{i,j}$ mod n, where j=1+$b_i$ doesn't divide $B_{i,j}$, where j=2−$b_i$ The verifying system returns true as long as all the verifications pass and as long as all both criterion are satisfied for 1≤i≤M.

In case we relax the requirement on $r_{i,2}$ to be a prime multiplied by a small number, we can take the gcd of all the $B_{i,j}$'s and making sure it is smaller than the allowed bound.

The escrow authorities recover the unopened $r_{i,j}$ by computing $B_{i,j}/$(Y raised to the $k_{i,j}$ power mod Q) using the private shares of X and $A_{i,j}$. In the recovery process, the opened $r_{i,j}$ are found in the same way as in the verifying system. The escrow authorities operate in the same way as before using these pairs of roots and the gcd algorithm to factor n.

In another embodiment, the interactive version of the proof for P can be used. Note that by outputting P, a shadow public key cryptosystem may result. This follows from the fact that the $Z_i$ can be chosen explicitly by a malicious user.

A primary PKI using our system can be the RSA system (Rivest 1983). In yet another embodiment, the public exponent of the escrow authorities E, is equal to 2. This implies that the commitments are performed using Rabin's system which is known in the art, thereby weakening the cryptographic assumptions necessary for security.

An application of this invention is a hierarchical public key escrow system. A hierarchical public key escrow system is an escrow system that takes the form of a tree data structure. The escrow authorities at the root of the tree are able to decrypt the communications of all entities corresponding to the nodes of the rest of the tree. Recursively, the escrow authorities at any given node i in the tree are able to decrypt the communications of all entities corresponding to the nodes in the rest of the subtree for which node i is root. Any time, the leaf of the tree can form another subtree and act as an escrow agent(s). For example, in FIG. 10 the Root Escrow Authority (EA) can decrypt all of the communications of $EA_1, EA_2, EA_3, \ldots EA_i$, and below (all nodes below it). More specifically, in step 1 the root escrow authority decrypts data encrypted by $EA_1$. Also, $EA_1$ can decrypt all of the communications of $EA_1, EA_2, EA_3, \ldots, EA_i$, and below, etc. So in step 2 $EA_1$ decrypts the communications of $EA_i$. By ordering the size of the moduli properly, it is possible to have multiple escrow agents for any node of the tree. All that is necessary is to do the commitments of the roots starting with the smallest modulus and ending with the largest.

As a concrete example, the root of a depth-3 tree can be the federal government. Let Nus denote the escrowing public key of the federal government. It can be generated using (A. De Santis, Y. Desmedt, Y. Frankel, M. Yung, "How to Share a Function Securely", ACM STOC '94, pages 522–533, 1994), so that the private exponent is shared among m escrow authorities. For concreteness, suppose that $|N_{US}|=1028$ bits. In this system, each of the fifty states has two escrow agents. So, let $N_{CT1}$ and $N_{CT2}$ be the public keys of Connecticut, where $|N_{CT1}|=|N_{CT2}|=1026$ bits. Let us assume that Alice knows the factorization of $N_{CT1}$ and Bob knows the factorization of $N_{CT2}$, and that $N_{US}>N_{CT1}>N_{CT2}$. The primary embodiment of the present invention explains exactly how Alice and Bob can generate their keys using $N_{US}$. Let Carol be a US citizen and a Connecticut state resident. Carol can generate a public key n using both $N_{CT1}$ and $N_{CT2}$ as follows. She generates n s.t. $n<N_{CT2}$, and s.t. $|n|=1024$. She then commits to a root of $Q_i$ by first encrypting with $N_{CT2}$ and then encrypting the result with $N_{CT1}$. Thus, the commitment aspect of the user system uses both $N_{CT2}$ and $N_{CT1}$. This way, Carol is certain the Alice needs Bob and vice-versa to factor n. Note that rather than using function sharing, we could have used two different keys $N_{US1}$ and $N_{US2}$ at the root level, just as we did for Alice and Bob.

Similarly, rather than a fixed tree which determines an order, the user can decide on a subset of escrow agents and generate its own preferred tree which is the chosen subset of escrow agents ordered by the relative size of their public keys in a line where the largest key is the root. This enforces a structure of the commitment, and assures that the subset needs to work together to recover a key or information encrypted under the key.

Also, the previous Auto-Recoverable and Auto-Certifiable cryptosystem inventions (pending patent applications by Young and Yung) can be combined together to implement hierarchical key escrow systems. For example, the solution of the pending application from Aug. 29, 1997 can be combined with the solution of pending application Ser. No. 08/864,839 as follows. The root of the hierarchy uses the escrowing public key n. The children of the root use the escrowing public key Y mod 2(2tn+1). The next level down in the tree uses escrowing public key y mod 2(2tn+1)+1. Here n is a composite, 2tn+1 is prime, and 2(2tn+1)+1 is prime. Similarly, the present invention can be combined with the invention from Aug. 29, 1997. In this case, the root of the hierarchy uses the escrowing public key N. The children of this root use the escrowing public key n. Finally, the next level down in the hierarchy uses the public keys (y,g,2tn+1), where 2tn+1 is prime. Clearly, these auto-recoverable and auto-certifiable cryptosystem solutions can be combined in many different ways to implement hierarchical key escrow systems.

Another application of key escrow systems is a secure file system or file repository system with recoverable keys. Such a system can be implemented based on the previous embodiments, in particular based on the preceding paragraph. For example, user A can be the owner of the file, user B can be the file server, and the trustees can be file recovery agents. An example of a file could be a password, in which case, the file recovery agents are password recovery agents. The present invention can also be used for certified mail where the escrow authorities are certified mail servers, when a certified mail message does not reach the destination, but only a commitment to its encryption value is available (together with a signature of the sender) then the escrow authority can "open the mail" as disclosed by Young and Yung in pending application from Aug. 29, 1997. The hierarchical system above can assure better availability of such mail servers which can back lower level servers.

Thus, there has been described a new and improved key escrow system, its variants, and applications. It is to be understood that the prefered embodiment is merely illustrative of some of the many specific embodiments which represent applications of the principles and paradigms of the present invention. Clearly, numerous and alternate arrangements can be readily devised by those who are skilled in the art without departing from the scope of the present invention; some of these variations were discussed above.

What we claim is:

1. A method for generating public keys where the users public key is a key-based on a composite number, and a proof that the keys are known to the user and are recoverable, comprising the steps of:

the user's system generating a random string of bits based on system parameters;

the user running a key generation algorithm to get a secret and public key pair using the random string and public parameters;

the user constructing a proof being a string of bits whose public availability does not compromise the secret key, but at the same time provides confidence to an individual verifying entity that said secret key is known to its user and is recoverable.

2. A method for generating public keys where the users public key is a key based on a composite number, and a proof that the keys are known to their user and are recoverable, comprising the steps of:

the user's system generating a random string of bits based on system parameters;

the user running a key generation algorithm based on system parameters to get a secret and public key pair using the random string and public parameters;

the user engaging in a protocol with an entity whereby said entity repeatedly sends a challenge string and said user sends a response based on the challenge and the public and private key pair such that the public availability of said challenges and responses does not compromise the secret key, but at the same time provides confidence that said secret key is known and recoverable.

3. A method and apparatus for registering users into a Public Key Infrastructure (PKI) such that a user and his public key, which is based on a composite, is registered only upon verifying that the key is known and recoverable, comprising the steps of:

the user generating the keys as in claim 1, and in addition:

the user proving its identity to a registration authority;

the user sending to the registration authority the public key and a proof of the fact that the private key is known and recoverable;

if the registration authority is convinced of the validity of said fact and of the user's identity, then a certification authority issues a certificate for user's said public key.

4. A method and apparatus as in claim 3 wherein the registration authority, after verifying the validity of said public key, publishes said public key in a public key database, together with the user ID.

5. A method and apparatus as in claim 3 wherein the registration authority certifies the public key of said user by signing user's said public key using said registration authority's secret key, and where said registration authority retains the proof of the fact that the private key is known and recoverable as a "certificate of recoverability".

6. A method and apparatus for a key recovery agent to recover the user's private key, where said public key is based on a composite number, that uses at least one of the certified public key of said user available in the public key directory, information contained in said user's certificate of recoverability retained by certification authority, and public parameters, comprising of the following steps:

the key recovery agent reading the user's certified public key from the public key directory;

running an information recovery algorithm based on the following inputs: said user's certified public key, the public system parameters, and the private key of said recovery agent; running said information recovery algorithm resulting in the secret information of said user.

7. A method and apparatus for a plurality of key recovery agents to recover the user's private key or information encrypted under said user's corresponding public key, where said public key is a composite, that uses at least one of the certified public key of said user available in the public key directory, information contained in said users certificate of recoverability, and public parameters, comprising of the following steps:

a subset of said plurality of key recovery agents obtain said user's public key;

each member of said subset runs a key recovery algorithm based on the following inputs: said user's certified public key, the public system parameters, and the private key of said member of said subset;

running said key recovery algorithm resulting in a partial result of member of said subset; all said partial results of said members of said subset are combined using a software algorithm or a tamper-proof hardware implementation of it, to generate said private key of said user or said information encrypted under said user's public key.

8. An apparatus for generating public keys which can be used in a public key encryption algorithm to encrypt data and a proof that the keys were generated by a specific algorithm comprising one or more of the following steps:

generating a seed s which is used in conjunction with a hash function F s.t. F(s) contributes to half of the entropy in the generation of n;

generating a composite n and a public exponent e;

generating M quadratic residues $Q1, Q2, \ldots, QM \mod n$;

computing two ambivalent roots $r_{i,1}$ and $r_{i,2}$ for each quadratic residue $Qi$;

committing to each of the 2M roots by preprocessing it and by raising the result to the Eth power mod N;

generating the challenge bits bi using a hash function H, the Qi and the $C_{i,j}$;

setting Zi to be either $r_{i,1}$ or $r_{i,2}$ based on challenge bit bi;

outputting the Qi, $C_{i,j}$, Zi;

outputting s;

where the user's public key is n and the user's private key is p, or the inverse of the users public exponent e mod (p−1)(q−1) and where the proof P that the public key n is known and recoverable is the string $P=((Q1,C1,1,C1,2), \ldots, (QM,CM,1,CM,2),Z1,\ldots, ZM)$ and where the proof P may also include s.

9. An apparatus for generating public keys which can be used in a public key encryption algorithm to encrypt data and proving that the keys were generated by a specific algorithm comprising of one or more of the following steps performed in an arbitrary order:

generating a seed s which is used in conjunction with a hash function F s.t. F(s) contributes to half of the entropy in the generation of n;

generating a composite n and a public exponent e;

generating M quadratic residues $Q1, Q2, \ldots, QM \mod n$;

computing two ambivalent roots $r_{i,1}$ and $r_{i,2}$ for each quadratic residue Qi;

committing to each of the 2M roots by raising each root after a possible preprocessing to the Eth power mod N;

sending n and the Qi to the verifier;

sending s to the verifier;

the verifier sends the prover M randomly chosen challenge bits bi;

the prover sends to the verifier the M roots corresponding to the M challenge bits;

the verifier verifies that s correctly contributes to half of the entropy of n;

the verifier verifies that the roots are indeed valid roots of the Qi;

the verifier verifies that the roots are indeed the plaintexts in the M commitments that are opened;

the verifier verifies that no pair of commitments corresponding to Qi contain two non-ambivalent roots of Qi;

the verifier verifies other facts about the values, including that the values that the prover sends lie in the correct sets, and that n<N;

where the user's public key is n and e, and the user's private key is p, or the inverse of the users public exponent e mod (p−1)(q−1).

10. An apparatus for enabling an individual verifying entity to verify the recoverability of a private key where said private key can be used to decrypt data, generated as in claim 8 comprising the steps of:

the entity obtaining the public key n and the proof P which was supposed to have been computed as in claim 8;

the entity verifying the proof P as constructed in claim 8;

where if any of the verifications fail then the verifying entity assumes that the private key is not recoverable by the escrow authorities and where otherwise, it is assumed that the private key is recoverable by the escrow authorities.

11. An apparatus for an entity to verify the recoverability of a private key as in claim 10, taking the subsequent action of informing the entity whether or not the private key is escrowed properly or not.

12. A method for key generation that outputs a public key which is based on a composite number and which can be used to encrypt data, private key which can be used to decrypt data, and a proof that the private key is recoverable by another entity or entities, wherein the proof contains an implicit encryption of the generated private key under said another entity or entities keys.

13. A method and apparatus as in claim 10 wherein the function that verify recoverability are implemented as a hardware device.

14. A method for key escrow where each user's public key, which is based on a composite, is accompanied by a publicly available self-certifying proof which enables anyone to verify that the corresponding private key is recoverable by another entity or entities.

15. A method and apparatus for generating public keys which can be used to encrypt data, verifying the recoverability of the corresponding private keys, and recovering said private keys in a key escrow system in the form of a hierarchical tree, with the property that a given node in the tree is able to decrypt the communications of all nodes in the subtree for which it is root, and with the property that no node can decrypt the communications of any node outside of the subtree for which it is root.

16. A method and apparatus as in claim 15, wherein the hierarchical tree structure is determined by each user separately.

17. A method and apparatus for generating a composite n which can be used as a public key to encrypt data and a seed s that uses a one-way hash function which is applied to s to represent half of the bits of n in order to avoid a potential abuse of the subliminal channel present in n.

18. A method and apparatus that takes n and s which were generated as in claim 17 and outputs true if and only if n contains no subliminal channel abuse of significant bandwidth, otherwise false is output.

19. A hierarchical tree organization of escrow agents which is employed as a certified mail service where each node in a tree is able to perform the services of each node in its subtree thus increasing the availability of the certified mail service.

* * * * *